(12) United States Patent
Howell et al.

(10) Patent No.: US 10,712,155 B2
(45) Date of Patent: Jul. 14, 2020

(54) TECHNOLOGIES FOR TRACKING AND LOCATING UNDERGROUND ASSETS

(71) Applicant: HOWELL ASSET LOCATOR, LLC, Ft. Wright, KY (US)

(72) Inventors: James P. Howell, Ft. Wright, KY (US); Matthew B. Sunday, California, KY (US); Joseph H. Althaus, Yellow Springs, OH (US)

(73) Assignee: Howell Asset Locator, LLC, Walton, KY (US)

( * ) Notice: Subject to any disclaimer, the term of this patent is extended or adjusted under 35 U.S.C. 154(b) by 0 days.

(21) Appl. No.: 16/124,160

(22) Filed: Sep. 6, 2018

(65) Prior Publication Data

US 2019/0072386 A1 Mar. 7, 2019

Related U.S. Application Data

(60) Provisional application No. 62/554,768, filed on Sep. 6, 2017.

(51) Int. Cl.
*G01C 15/00* (2006.01)
*G01S 19/07* (2010.01)
(Continued)

(52) U.S. Cl.
CPC .......... *G01C 15/008* (2013.01); *G01C 21/16* (2013.01); *G01S 17/08* (2013.01); *G01S 17/86* (2020.01);
(Continued)

(58) Field of Classification Search
CPC ....... G01C 15/008; G01C 21/16; G01S 17/86; G01S 19/43; G01S 19/45
(Continued)

(56) References Cited

U.S. PATENT DOCUMENTS 5,528,518 A   6/1996   Bradshaw et al.
5,539,513 A   7/1996   Dunne
(Continued)

FOREIGN PATENT DOCUMENTS

CA       2692115 C        3/2016
WO    2007055577 A1     5/2007
(Continued)

OTHER PUBLICATIONS

International Search Report and Written Opinion of the International Searching Authority for International Patent App. No. PCT/US2018/049810 dated Nov. 20, 2018; 18 pages.
(Continued)

*Primary Examiner* — Bo Fan
(74) *Attorney, Agent, or Firm* — Ulmer & Berne LLP

(57) ABSTRACT

Technologies for tracking and locating underground assets include a survey instrument having an asset tracking device. The asset tracking device determines a current geographic location of the survey instrument and a heading of a sensor group of the survey instrument when aimed at a target measurement point of an underground asset. The asset tracking device measures the distance between the sensor group and the target measurement point of the underground asset. The asset tracking device also determines the pitch of the sensor group when aimed at the target measurement point of the underground asset. The effective height of the sensor group relative to the elevation at the survey location is also determined. The asset tracking device determines the geographic location and a corresponding depth of the target measurement point on the underground asset based on the determined and measured information. Other embodiments are described and claimed.

10 Claims, 8 Drawing Sheets

(51) Int. Cl.
  *G01S 19/14* (2010.01)
  *G01S 17/08* (2006.01)
  *G01S 19/45* (2010.01)
  *G01S 19/43* (2010.01)
  *G01C 21/16* (2006.01)
  *G01S 17/86* (2020.01)

(52) U.S. Cl.
  CPC ............. *G01S 19/07* (2013.01); *G01S 19/14* (2013.01); *G01S 19/43* (2013.01); *G01S 19/45* (2013.01)

(58) Field of Classification Search
  USPC ..................................... 342/357.23; 348/135
  See application file for complete search history.

(56) References Cited

U.S. PATENT DOCUMENTS

| | | | |
|---|---|---|---|
| 5,576,973 A | 11/1996 | Haddy | |
| 5,612,779 A | 3/1997 | Dunne | |
| 5,696,705 A | 12/1997 | Zykan | |
| 5,859,693 A | 1/1999 | Dunne et al. | |
| 5,949,529 A | 9/1999 | Dunne et al. | |
| 6,057,910 A | 5/2000 | Dunne | |
| 6,144,308 A | 11/2000 | Dunne | |
| 6,226,077 B1 | 5/2001 | Dunne | |
| 6,282,803 B1 | 9/2001 | Dunne | |
| 6,445,444 B2 | 9/2002 | Dunne | |
| 6,480,148 B1 | 11/2002 | Wilson et al. | |
| 6,710,741 B2 | 3/2004 | Tucker | |
| 6,751,553 B2 | 6/2004 | Young et al. | |
| 6,825,793 B2 | 11/2004 | Taylor, Jr. et al. | |
| 6,920,394 B2 | 7/2005 | Johnson | |
| 6,999,021 B2 | 2/2006 | Taylor, Jr. et al. | |
| 7,113,124 B2 | 9/2006 | Waite | |
| 7,336,078 B1 | 2/2008 | Merewether et al. | |
| 7,409,312 B2 | 8/2008 | Conner et al. | |
| 7,834,806 B2 | 11/2010 | Tucker et al. | |
| 8,240,186 B2 | 8/2012 | Dunne | |
| 8,264,226 B1 | 9/2012 | Olsson et al. | |
| 8,280,631 B2 | 10/2012 | Nielsen et al. | |
| 8,416,995 B2 | 4/2013 | Nielsen et al. | |
| 8,478,525 B2 | 7/2013 | Nielsen et al. | |
| 8,478,617 B2 | 7/2013 | Nielsen et al. | |
| 8,589,201 B2 | 11/2013 | Nielsen et al. | |
| 8,731,999 B2 | 4/2014 | Nielsen et al. | |
| 8,907,980 B2 | 12/2014 | Nielsen et al. | |
| 9,134,339 B2 | 9/2015 | Becker et al. | |
| 9,208,464 B2 | 12/2015 | Nielsen et al. | |
| 9,230,453 B2 | 1/2016 | Van Sickle | |
| 9,235,823 B2 | 1/2016 | Rushing | |
| 9,292,813 B2 | 3/2016 | Tucker et al. | |
| 9,317,830 B2 | 4/2016 | Nielsen et al. | |
| 9,359,880 B2 | 6/2016 | Narayan et al. | |
| 2003/0012411 A1 | 1/2003 | Sjostrom et al. | |
| 2008/0015811 A1 | 1/2008 | Conner et al. | |
| 2008/0180322 A1 | 7/2008 | Islam et al. | |
| 2009/0112472 A1* | 4/2009 | Montgomery | G01C 21/04 701/514 |
| 2010/0188407 A1 | 7/2010 | Nielsen et al. | |
| 2010/0257029 A1 | 10/2010 | Nielsen et al. | |
| 2011/0035252 A1 | 2/2011 | Nielsen et al. | |
| 2012/0242341 A1* | 9/2012 | Olsson | G01V 3/15 324/326 |
| 2014/0346223 A1 | 11/2014 | Van Sickle | |
| 2015/0123664 A1 | 5/2015 | Olsson et al. | |
| 2015/0355337 A1* | 12/2015 | Adair | G01C 9/06 702/152 |
| 2015/0355364 A1* | 12/2015 | Bailey | G01V 3/165 324/326 |

FOREIGN PATENT DOCUMENTS

| | | |
|---|---|---|
| WO | 2017114577 A1 | 7/2017 |
| WO | 2019051134 A1 | 3/2019 |

OTHER PUBLICATIONS

Roberts et al., "Is Neo-Cadastral Surveying on your Smart Phone Feasible?", Proceedings of the Surveying & Spatial Sciences Conference 2013, Apr. 2013, 12 pages.
Optimal Ranging, Inc., "Underground Utility 3-D Survey: Product Brief", 2012, 8 pages.
Cambridge Consultants, "Asset protection: Mobile locate technology" <http://www.cambridgeconsultants.com/projects/asset-protection-mobile-locate-technology>, archived web page from Oct. 29, 2016 available at <http://web.archive.org/web/20161029172855/http://www.cambridgeconsultants.com:80/projects/asset-protection-mobile-locate-technology> (retrieved on Mar. 20, 2019), 4 pages.
Zandbergen et al., "Positional Accuracy of Assisted GPS Data from High-Sensitivity GPS-enabled Mobile Phones", The Journal of Navigation, Jul. 2011, vol. 64, pp. 381-399.
Augview Augmented Technology, "Using Reality to Improve Mobile Asset Management H&S for field crews", Sep. 2015, 29 pages.
Trimble, Inc., "Datasheet—Trimble Geo 7X Handheld", Apr. 2015, 2 pages.
Atlas Copco, "The Art of Ergonomics", 2013, 40 pages.
Faro Technologies, "Products:3D Surveying" <http://www.faro.com/en-us/products/3d-surveying>, archived web page from Sep. 12, 2015 available at <http://web.archive.org/web/20150912100702/http://www.faro.com/en-us/products/3d-surveying> (retrieved on Mar. 22, 2019), 1 page.
SECO, "2017 SECO Catalog", Jan. 2017, 80 pages.
Trimble, Inc., "Geospatial GNSS Systems", Apr. 2016, 12 pages.
Laser Technology, Inc., "GPS Laser Offsets" <http://www.lasertech.com/GPS-Laser-Offsets.aspx>, archived web page from Feb. 26, 2017 available at <http://web.archive.org/web/20170226112352/http://www.lasertech.com/GPS-Laser-Offsets.aspx> (retrieved Mar. 20, 2019), 4 pages.
Laser Technology, Inc., "Laser Technology, Inc. TruPulse® 360R User's Manual", Second Edition, Feb. 2017, 58 pages.
Laser Technology, Inc., "GIS / GPS Mapping" <https://www.lasertech.com/GIS-GPS-Mapping.aspx>, archived web page from Feb. 26, 2017 available at <http://web.archive.org/web/20170226124112/https://www.lasertech.com/GIS-GPS-Mapping.aspx> (retrieved Mar. 20, 2019), 2 pages.

\* cited by examiner

TECHNOLOGIES FOR TRACKING AND LOCATING UNDERGROUND ASSETS

CROSS REFERENCE TO RELATED APPLICATION

This application claims the benefit of U.S. Provisional Patent Application Ser. No. 62/554,768, filed on Sep. 6, 2017, entitled "TECHNOLOGIES FOR TRACKING AND LOCATING UNDERGROUND ASSETS," the disclosure of which is hereby incorporated by reference in its entirety.

TECHNICAL FIELD

Embodiments of the technologies described herein relate, in general, to tracking and locating underground assets. More particularly, the technologies described herein relate to enabling the location and depth of a underground asset to be tracked and later identified from safe distances.

SUMMARY

In an embodiment, the present disclosure is directed, in part, to a method for tracking an underground asset. The method includes determining, by a survey instrument, a current geographic location of the survey instrument positioned at a survey location. The survey location may be proximate to an excavated area including an underground asset. The method further includes determining, by the survey instrument, a heading of an adjustable sensor group of the survey instrument aimed at a target measurement point on the underground asset. Additionally, the method includes measuring, by the survey instrument, a distance between the adjustable sensor group and the target measurement point on the underground asset. The method further includes determining, by the survey instrument, a pitch angle at which the adjustable sensor group is aimed at the target measurement point on the underground asset. Also, the method includes determining, by the survey instrument, a geographic location of the target measurement point on the underground asset based at least in part on the current geographic location of the survey instrument, the determined heading, the measured distance between the adjustable sensor group and the target measurement point, and the determined pitch angle at which the adjustable sensor group is aimed at the target measurement point. The method additionally includes determining, by the survey instrument, an effective height of the adjustable sensor group relative to an elevation corresponding to the survey location. Further, the method includes determining, by the survey instrument, a depth of at least a portion of the underground asset at the target measurement point based at least in part on the determined height of the adjustable sensor group relative to the elevation corresponding to the survey location, the measured distance between the adjustable sensor group and the target measurement point, and the determined pitch angle at which the adjustable sensor group is aimed at the target measurement point.

In some embodiments, the method further includes receiving, by the survey instrument, a communication transmitted from a base station. The base station may have a known geographic location and elevation and the communication transmitted from the base station may include a correction signal. In such embodiments of the method, determining the current geographic location of the survey instrument includes determining the current geographic location of the survey instrument at the survey location based at least in part on the correction signal.

Additionally, in some embodiments, the method further includes determining, by the survey instrument and based at least in part on the measured distance and the determined pitch angle, a position difference between the current geographic location of the survey instrument and the target measurement point on the underground asset. In such embodiments of the method, determining the geographic location of the target measurement point on the underground asset includes determining the geographic location of the target measurement point on the underground asset based at least in part on the current geographic location of the survey instrument, the determined heading, and the determined position difference.

In some embodiments the method also includes determining, by the survey instrument, a tilt angle at which the survey instrument is positioned relative to a vertical plane. In such embodiments of the method, determining the effective height of the adjustable sensor group includes determining the effective height of the adjustable sensor group relative to the elevation corresponding to the survey location based at least in part on the determined tilt angle at which the survey instrument is positioned relative to the vertical plane and a reference distance between the adjustable sensor group and a distal point of the survey instrument.

Additionally, in some embodiments, the also includes storing, by the survey instrument, the determined geographic location and the depth of the target measurement point on the underground asset for later identification of a portion of the underground asset. The method may also include storing, by the survey instrument, an annotation corresponding to the underground asset, in some embodiments. In such embodiments, the method may further include storing the determined geographic location and the depth of the target measurement point and/or the annotation corresponding to the underground asset in a remote data store.

In another embodiment, the present disclosure is directed, in part, to a survey instrument for tracking an underground asset. The survey instrument includes a central support member configured to be positioned at a survey location. The survey location may be proximate to an excavated area including an underground asset. The survey instrument also includes an adjustable sensor group configured rotate relative to the central support member. The adjustable sensor group includes a distance sensor and an encoder. The survey instrument also includes an asset tracking device positioned between a lower end and an upper end of the central support member. The asset tracking device includes a processor to execute instructions stored in memory. The instructions, when executed by the processor, cause the asset tracking device to determine a current geographic location of the survey instrument positioned at the survey location. The instructions, when executed by the processor, further cause the asset tracking device to determine a heading of the adjustable sensor group of the survey instrument aimed at a target measurement point on the underground asset. The instructions, when executed by the processor, also cause the asset tracking device to measure, via the distance sensor, a distance between the adjustable sensor group and the target measurement point on the underground asset and measure, via the encoder, a pitch angle at which the adjustable sensor group is aimed at the target measurement point on the underground asset. Additionally, the instructions, when executed by the processor, cause the asset tracking device to determine a geographic location of the target measurement point on the underground asset based at least in part on the current geographic location of the survey instrument, the determined heading, the measured distance between the adjustable sensor group and the target measurement point, and the measured pitch angle at which the adjustable sensor group is aimed at the target measurement point. The instructions, when executed, further cause the asset tracking device to determine an effective height of the adjustable sensor group relative to an elevation corresponding to the survey location. Additionally, when executed, the instructions cause the asset tracking device to determine a depth of at least a portion of the underground asset at the target measurement point based at least in part on the determined height of the adjustable sensor group relative to the elevation corresponding to the survey location, the measured distance between the adjustable sensor group and the target measurement point, and the measured pitch angle at which the adjustable sensor group is aimed at the target measurement point.

In some embodiments of the survey instrument, the instructions further cause the asset tracking device to receive a communication transmitted from a base station. The base station may have a known geographic location and elevation and the communication transmitted from the base station including a correction signal. In such embodiments, determination of the current geographic location of the survey instrument includes determination of the current geographic location of the survey instrument at the survey location based at least in part on the correction signal.

Additionally, in some embodiments of the survey instrument, the instructions further cause the asset tracking device to determine, based at least in part on the measured distance and the measured pitch angle, a position difference between the current geographic location of the survey instrument and the target measurement point on the underground asset. In such embodiments, determination of the geographic location of the target measurement point on the underground asset includes determination of the geographic location of the target measurement point on the underground asset based at least in part on the current geographic location of the survey instrument, the determined heading, and the determined position difference.

In some embodiments, the adjustable sensor group of the survey instrument includes an inertial measurement sensor. In such embodiments, the instructions also cause the asset tracking device to determine, via the inertial measurement sensor, a tilt angle at which the survey instrument is positioned relative to a vertical plane. Further, in such embodiments, determination of the effective height of the adjustable sensor group includes determination of the effective height of the adjustable sensor group relative to the elevation corresponding to the survey location based at least in part on the determined tilt angle at which the survey instrument is positioned relative to the vertical plane and a reference distance between the adjustable sensor group and a distal point of the survey instrument.

Additionally, in some embodiments of the survey instrument, the instructions further cause the asset tracking device to store the determined geographic location and depth of the target measurement point on the underground asset for later identification of a portion of the underground asset. The instructions may also cause the asset tracking device to store an annotation corresponding to the underground asset, in some embodiments. In such embodiments of the survey instrument, the instructions may cause the asset tracking device to store the determined geographic location, the depth of the target measurement point, and/or the annotation corresponding to the underground asset in a remote data store.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
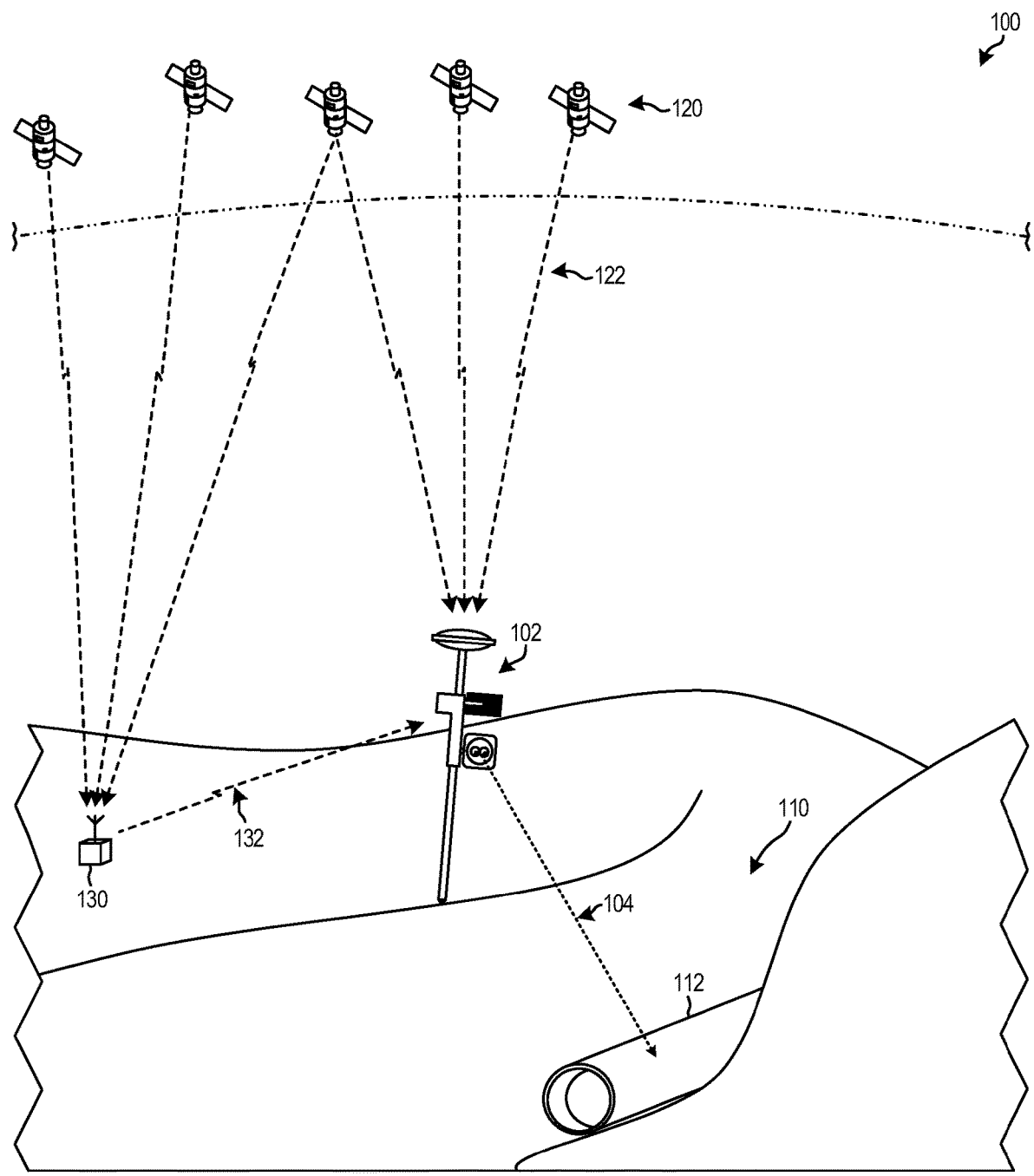
FIG. 1 is an illustrative diagram of at least one embodiment of system for tracking and identifying the location and depth of an underground asset.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc.

Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware.

The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Referring now to FIGS. 1-5, in one embodiment, a system 100 for tracking and identifying a location and corresponding depth of an underground asset 112 (or a portion thereof) includes a survey instrument 102, one or more orbiting navigation satellites 120, and a benchmark and/or a base station 130 having a known location and elevation. The underground asset 112 may be any type of component, material, or asset installed or suitable to be installed at, above, or below grade. That is, the underground asset 112 does not need to be buried or covered to be tracked and identified by the technologies disclosed herein. For example, the underground asset 112 may be a water main, a sewer line, a gas line, power or telecommunication lines, an electrical or telecommunications conduit, a pipe, a connector, underground electrical structures (e.g., underground transformers, etc.), and/or any other component, material, or asset installed or suitable to be installed at, above, or below grade.

In use, the survey instrument 102 (e.g., a "rover") is positioned at a survey location proximate to a portion of the underground asset 112 during installation, repair, and/or identification thereof. For example, referring specifically to FIG. 5, the survey instrument 102 may be positioned at the survey location 310 proximate to the trench 110 or excavated area of soil (or other material) within which the underground asset 112 is being installed, repaired, and/or identified. As discussed in more detail herein, the survey instrument 102 receives data or signals 122 transmitted by the orbiting navigation satellites 120 (e.g., Global Positioning System (GPS) satellites). Additionally, the survey instrument 102 receives data or signals 132 (e.g., correction signals) transmitted by the base station 130, which can be located at a benchmark. The survey instrument 102 is configured to determine an accurate location (e.g., latitude and longitude) and elevation (e.g., meters, inches, feet, etc.) based at least in part on, or otherwise as a function of, the signals 122 received from the navigation satellites 120 and the signals 132 received from the base station 130. More specifically, once positioned at the survey location 310, the survey instrument 102 is configured to initially determine its current geographic location (e.g., latitude and longitude) and elevation via the signals 122 received from the navigation satellites 120. Thereafter, the survey instrument 102 is configured to utilize the signals 132 received from the base station 130 to correct or otherwise increase the accuracy of the location and elevation determined from the signals 122 received from the navigation satellites 120. In the illustrative embodiment, the survey instrument 102 is configured to utilize Real-Time Kinematics (RTK) navigation techniques and components to provide such corrections or increased accuracy. Additionally or alternatively, other location correction techniques can also be used to provide increased accuracy (e.g., Satellite-based Augmentation Systems (SBAS), Radio Technical Commission for Maritime Services (RTCM), etc.). It should be appreciated, however, that although RTK correction techniques (or other location correction techniques) are utilized in the illustrative embodiments described herein, the current geographic location of the survey instrument 102 can be obtained without the use of such correction techniques. For example, in embodiments in which the survey instrument 102 (or a component thereof) is capable of independently determining an accurate geographic location at the survey location 310, the survey instrument 102 need not receive communications (e.g., correction signals, etc.) from the base station 130.

After an accurate geographic location (e.g., latitude and longitude) and elevation of the survey instrument 102 at the survey location 310 has been determined, the survey instrument 102 is configured to determine a location and corresponding depth of a portion of an underground asset 112. To do so, as described in more detail herein, the survey instrument 102 is configured to project a laser beam 104 to a target measurement point 312 or location on the underground asset 112 and measure the straight-line distance M therebetween. In addition to determining the distance M between the survey instrument 102 and the target measurement point 312 or location on the underground asset 112, the survey instrument 102 is configured to determine a pitch angle Θ of the projected laser beam 104. Based at least in part on, or otherwise as a function of, the measured straight-line distance M and the pitch angle Θ of the projected laser beam 104, the survey instrument 102 is configured to determine the position difference ΔP (i.e., the distance) between the location (e.g., latitude and longitude) of the survey instrument 102 at the survey location 310 and the target measurement point 312 or position on the underground asset 112.

After the position difference ΔP between the current geographic location of the survey instrument 102 at the survey location 310 and the target measurement point 312 or position on the underground asset 112 has been determined, the survey instrument 102 is configured to determine the elevation or depth D corresponding to the target measurement point 312 on the underground asset 112. In the illustrative embodiment, the depth D determined by the survey instrument 102 is calculated relative to the elevation determined at the survey location 310 at which the survey instrument 102 is positioned. It should be appreciated, however, that the depth D determined by the survey instrument 102 may also be based other elevations or factors. For example, in some embodiments, the depth D determined by the survey instrument 102 may factor in variables such as the tilt angle θ, φ of the survey instrument 102 (see FIG. 5) and/or other offset variables (e.g., an elevation difference between an initial grade and a planned final grade at the survey location 310, attachment or extension lengths added to the survey instrument 102, etc.).

Figure 6:
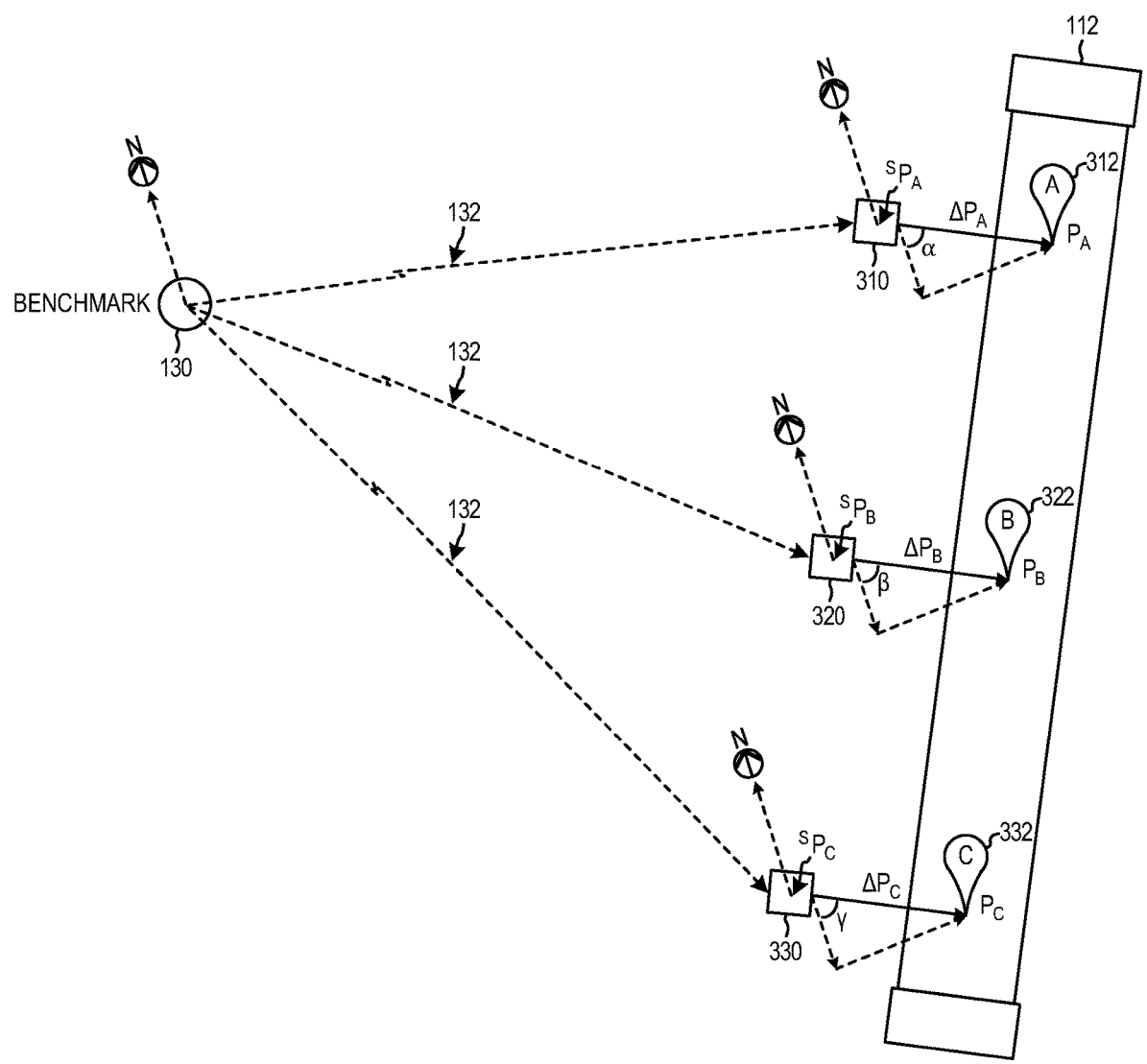
FIG. 6 is an illustrative diagram of using the survey instrument of FIGS. 1 and 2 to track the location and depth of multiple positions along the length of an underground asset.

The survey instrument 102 is also configured to determine the coordinates (e.g., latitude and longitude) of the location corresponding to the target measurement point 312 or position on the underground asset 112 based at least in part on, or otherwise as a function of, the determined position difference ΔP and a bearing or heading of the survey instrument 102 relative to magnetic north (see FIG. 6). To do so, in some embodiments, the survey instrument 102 may include a magnetic compass or other sensor configured to measure a heading or bearing of the survey instrument 102, or a portion thereof. Additionally or alternatively, as discussed herein, the survey instrument 102 (or components thereof) may be configured to use signals 132 (e.g., correction signals) and/or data messages transmitted by the base station 130 to determine the heading or bearing. Furthermore, in some embodiments, the survey instrument 102 can be used to "shoot" the base station 130 or a benchmark (e.g. measure the angle and/or distance between the survey instrument 102 and the base station 130 or benchmark). It should be appreciated that the bearing or heading utilized by the survey instrument 102 may be relative to any other reference heading or point, in other embodiments.

As discussed, the system 100 includes the survey instrument 102, orbiting navigation satellite(s) 120, and the base station 130, which as discussed above, may be located at a benchmark having a known location and elevation. It should be appreciated that the benchmark and/or base station 130 may have a known location and elevation that can be referenced by other devices to, for example, create a heading angle and/or correct location data. As discussed in more detail below the base station 130 can be embodied as a Real-Time Kinematics (RTK) base station 130 configured to communicate with the survey instrument 102 and/or other computing or survey devices of the system 100 via radio communications such as, for example, cellular communications or any other form of wireless communications. Additionally or alternatively, the base station 130 can be embodied as one or more radio communications towers such as a cellular communications towers. In such cases, the survey instrument 102 and/or other computing or survey devices of the system 100 may receive signals from the radio communications towers (i.e., the base stations 130) and, based at least in part on the signals received from the radio communication towers, determine a current location and/or location correction data. For example, in some embodiments, the survey instrument 102 and/or the other computing devices of the system 100 can be configured to utilize data and/or properties of signals (e.g., signal-to-noise ratio data, location data, tower identification data, etc.) transmitted by the radio communications towers to triangulate their position and/or determine a more accurate position than possible using conventional location determination techniques.

Figure 2:
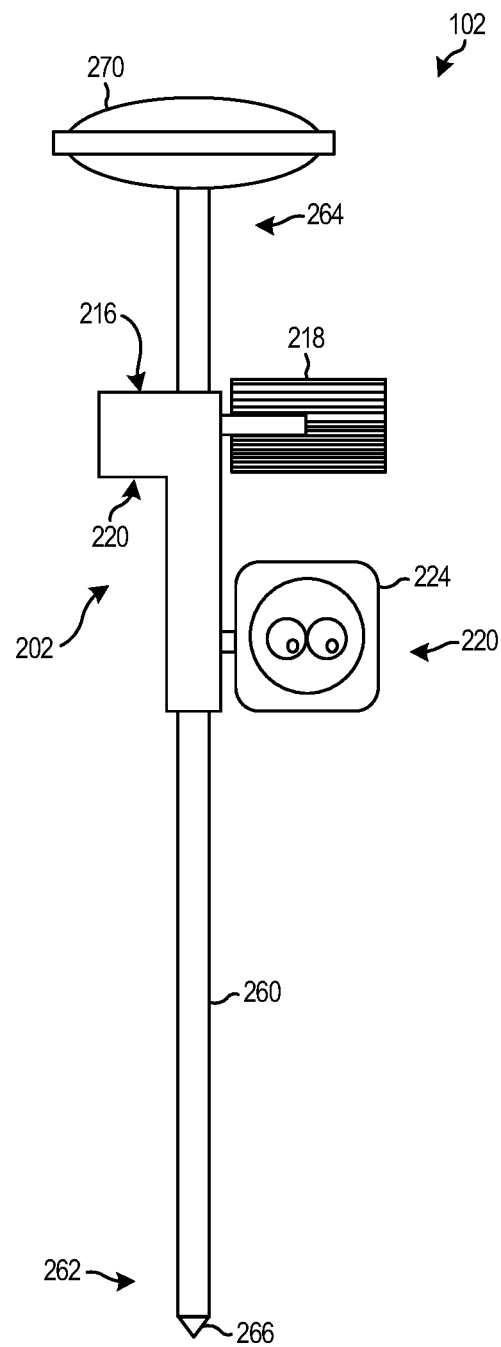
FIG. 2 is an illustrative diagram of various components and features of the survey instrument of FIG. 1.

As illustratively shown in FIG. 2, the survey instrument 102 includes a central support member 260. In the illustrative embodiment, the support member 260 is embodied as a cylindrical bar and is constructed from steel, carbon fiber, and/or any other rigid material or combinations thereof. It should be appreciated, however, that the support member 260 may include any other geometric cross section, in other embodiments. The lower end 262 of the support member 260 may include a point 266 constructed to facilitate positioning of the survey instrument 102 at a specific location (e.g., the survey points/locations 310, 320, 330 of FIG. 6, etc.). Additionally, the upper end 264 of the support member 260 includes a GPS antenna 270 configured to facilitate receipt of the data or signals 122 transmitted by the orbiting navigation satellites 120.

In the illustrative embodiment, the support member 260 of the survey instrument 102 further includes an asset tracking device 202 positioned between the lower end 262 and the upper end 264. The asset tracking device 202 can be embodied as any type of computing device or server capable of processing, communicating, storing, maintaining, and transferring data. For example, the asset tracking device 202 can be embodied as a microcomputer, a minicomputer, a custom chip, an embedded processing device, a mobile computing device, a handheld computer, a smart phone, a tablet computer, a personal digital assistant, a laptop computer, a desktop computer, and/or other computing device or suitable programmable device. In some embodiments, the asset tracking device 202 can be embodied as a computing device integrated with other systems or subsystems. As illustratively shown in FIG. 3, the asset tracking device 202 includes a processor 204, a system bus 206, a memory 208, a data storage 210, communication circuitry 212, one or more peripheral devices 214, various sensors 220, and a power source/power management circuity 250. Of course, the asset tracking device 202 can include other or additional components, such as those commonly found in a computer and/or server (e.g., various input/output devices), in other embodiments. Additionally, in some embodiments, one or more of the illustrative components can be incorporated in, or otherwise from a portion of, another component. For example, the memory 208, or portions thereof, can be incorporated in the processor 204 in some embodiments. Furthermore, it should be appreciated that the asset tracking device 202 can include other components, sub-components, and devices commonly found in a computer and/or computing device, which are not illustrated in FIG. 3 for clarity of the description.

The processor 204 can be embodied as any type of processor capable of performing the functions described herein. For example, the processor 204 can be embodied as a single or multi-core processor, a digital signal processor, a microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or any other type of processor or processing/controlling circuit or controller.

In various configurations, the asset tracking device 202 includes a system bus 206 for interconnecting the various components of the asset tracking device 202. The system bus 206 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 204, the memory 208, and other components of the asset tracking device 202. In some embodiments, the asset tracking device 202 can be integrated into one or more chips such as a programmable logic device or an application specific integrated circuit (ASIC). In such embodiments, the system bus 206 can form a portion of a system-on-a-chip (SoC) and be incorporated, along with the processor 204, the memory 208, and other components of the asset tracking device 202, on a single integrated circuit chip.

The memory 208 can be embodied as any type of volatile or non-volatile memory or data storage capable of performing the functions described herein. For example, the memory 208 can be embodied as read only memory (ROM), random access memory (RAM), cache memory associated with the processor 204, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 208 can store various data and software used during operation of the asset tracking device 202 such as operating systems, applications, programs, libraries, and drivers.

The data storage 210 can be embodied as any type of device or devices configured for short-term or long-term storage of data such as, for example, memory devices and circuits, memory cards, hard disk drives, solid-state drives, or other data storage devices. For example, in some embodiments, the data storage 210 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 204, or the memory 208 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 212 of the asset tracking device 202 may be embodied as any type of communication circuit, device, interface, or collection thereof, capable of enabling communications between the asset tracking device 202, an asset management server 140 (FIG. 4), a portable computing device (not shown), the base station 130, and/or any other computing devices communicatively coupled thereto. For example, the communication circuitry 212 may be embodied as one or more network interface controllers (NICs), in some embodiments. The communication circuitry 212 may be configured to use any one or more communication technologies (e.g., wireless or wired communications) and associated protocols (e.g., Ethernet, WiFi®, WiMAX, etc.) to effect such communication. In the illustrative embodiment, the communication circuitry 212 includes a wireless communication interface (e.g., Bluetooth®, mesh network, etc.) configured to enable communications between the asset tracking device 202 and the asset management server 140, the portable computing device, the base station 130, and/or any other computing device. Additionally or alternatively, in some embodiments, the communication circuitry 212 includes a wired communication interface (e.g., Ethernet, coaxial communication interface, USB, serial communication interface, parallel communication interface, etc.) configured to enable communications directly between the asset tracking device 202 and one or more computing devices (e.g., a portable computing device, a smartphone, etc.) via a physical communications connection.

In some embodiments, the asset tracking device 202, the asset management server 140, and/or any other computing devices of the system 100, can communicate with each other over one or more networks 150. The network(s) 150 can be embodied as any number of various wired and/or wireless communication networks. For example, the network(s) 150 can be embodied as or otherwise include a local area network (LAN), a wide area network (WAN), a cellular network, or a publicly-accessible, global network such as the Internet. Additionally, the network(s) 150 can include any number of additional devices to facilitate communication between the computing devices of the system 100.

Additionally, in some embodiments, the asset tracking device 202 can further include one or more peripheral devices 214. Such peripheral devices 214 can include any type of peripheral device commonly found in a computing device such as various user interface devices 216 (e.g., a joystick, buttons, controls, a hardware keyboard, a keypad, a gesture or graphical input device, a motion input device, a vibratory device, a computer mouse, a voice recognition unit, etc.), a display and/or a touchscreen interface 218, additional data storage, speakers, an audio unit, a peripheral communication device, and any other suitable user interface, input/output device, and/or other peripheral device. In some embodiments, the user interface devices 216 can be used to input data and/or annotations (e.g., asset type, asset description, asset material, dimensions, observed condition of asset, manufacturer, model number, installation or repair date, notes, etc.) corresponding to the underground asset 112 being installed, installed, repaired, and/or identified and/or another underground asset in proximity thereto.

Figure 3:
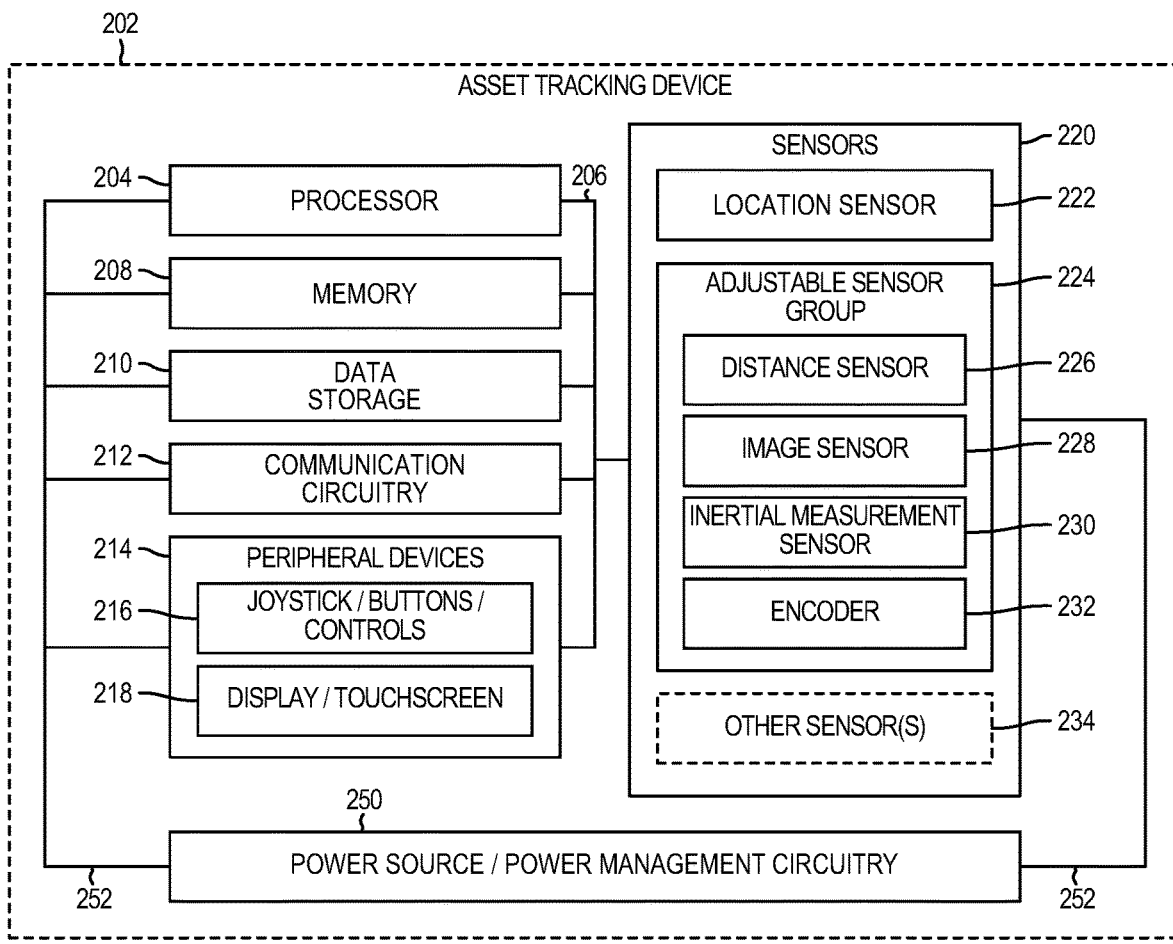
FIG. 3 is a simplified block diagram of at least one embodiment of an asset tracking device of the survey instrument of FIGS. 1 and 2.

As discussed, the asset tracking device 202 includes various sensors 220. For example, as shown in FIGS. 2 and 3, the asset tracking device 202 includes a location sensor 222, a distance sensor 226, an image sensor 228, an inertial measurement sensor 230, and an encoder 232. It should be appreciated that the asset tracking device 202 may include any other type of sensor 234 suitable for measuring and/or calculating distances, locations, elevations, angles, and/or any other type of data.

In the illustrative embodiment, one or more of the sensors 220 may form part of an adjustable sensor group 224. For example, as shown in FIG. 3, the adjustable sensor group 224 may include the distance sensor 226, the image sensor 228, the inertial measurement sensor 230, and the encoder 232. The adjustable sensor group 224 is configured to rotate or tilt relative to the support member 260 or any other portion of the survey instrument 102. Such capability enables operators of the survey instrument 102 to rotate or tilt the adjustable sensor group 224 in order to obtain distance and location measurements corresponding to points or locations on underground assets 112 being installed, repaired, and/or identified (either above or below grade). In some embodiments the adjustable sensor group 224 is configured to rotate or tilt within an angular range from about −90 degrees to about +90 degrees relative to the support member 260 or some other reference plane. It should be appreciated that, in some embodiments, the inertial measurement sensor 230 and/or the encoder 232 may be separate from the adjustable sensor group 224. For example, in some embodiments, the inertial measurement sensor 230 and/or the encoder 232 may be coupled to the support member 260 or another component of the survey instrument 102.

The location sensor 222 may be embodied as any type of device or circuitry configured to determine a current geographic location of the survey instrument 102. For example, in the illustrative embodiment, the location sensor 222 includes Global Positioning System (GPS) circuitry and Real-Time Kinematics (RTK) circuitry and/or logic. The GPS circuity is in electrical communication with the GPS antenna 270 and is configured to receive data or signals 122 transmitted by the orbiting navigation satellites 120 and determine a location therefrom. The RTK circuitry and/or logic is configured to communicate with corresponding RTK circuitry and/or logic of the base station 130 via one or more communication signals 132. Such communication signals 132 may include correction data transmitted by RTK circuitry and/or logic of the base station 130 and received by the RTK circuitry and/or logic of the location sensor 222. The correction data can be used by the RTK circuitry and/or logic, or another component of the asset tracking device 202, to increase the accuracy of the determined location for the survey instrument 102. In embodiments in which the location sensor 222, or more generally the asset tracking device 202, includes RTK logic instead of RTK circuitry, the RTK functionality described herein can be performed by the processor 204 in response to execution of instructions stored in a memory or a computer-readable device. Additionally or alternatively, in some embodiments, the RTK circuitry and/or logic may form part of the communication circuitry 212 and/or the location sensor 222.

The distance sensor 226 can be embodied as any type of sensor or optical device configured to measure the straight-line distance M between the survey instrument 102 and the target measurement point 312 or location on the underground asset 112. For example, in the illustrative embodiment, the distance sensor 226 is a laser range finder configured to project a laser beam 104 to the target measurement point 312 or location on the underground asset 112 and measure the straight-line distance M therebetween. It should be appreciated that, in some embodiments, the distance sensor 226 may not project a visible laser beam 104 to the target measurement point 312 on the underground asset 112. It should also be appreciated that the distance sensor 226 may be embodied as, or otherwise include, any other device suitable for measuring the distance between the survey instrument 102 and the target measurement point 312 on the underground asset 112, in other embodiments. For example, in some embodiments, the distance sensor 226 may be a sonic range finder device (e.g., sonar, echo location, ultrasonic range finding, etc.), a radar distance measurement device, and/or any other type of distance measuring device.

The image sensor 228 can be embodied as any type of camera and/or optical scanner, such as a digital camera (e.g., a digital point-and-shoot camera, a digital single-lens reflex (DSLR) camera, etc.), a video camera, or the like, that is capable of capturing images and/or video of an underground asset 112 being installed, repaired, and/or identified. Such images can be transmitted to the asset management server 140 for storage and processing. As discussed herein, such images can later be retrieved by an operator attempting to identify one or more locations at which the underground asset 112 is buried (or located, if installed at or below grade).

The inertial measurement sensor 230 may be configured to detect changes the angular position of the survey instrument 102 or components thereof (e.g., the adjustable sensor group 224). For example, in the illustrative embodiment, the inertial measurement sensor 230 is configured to determine the tilt angle (e.g., the tilt angle θ, the tilt angle φ, etc.) of the survey instrument 102. Additionally, in some embodiments, the inertial measurement sensor 230 is also configured to determine the pitch angle Θ of the projected laser beam 104. To do so, the inertial measurement sensor 230 may include one or more accelerometers, gyroscopes, and magnetometers configured to determine changes in pitch, roll, and/or yaw of the survey instrument 102 and components thereof. It should be appreciated that the inertial measurement sensor 230 may be embodied as any suitable electrical, mechanical, and/or optical encoder configured to generate angular measurements of the survey instrument 102 and/or components thereof.

The encoder 232 may be configured to detect changes the angular position of the adjustable sensor group 224 and/or components thereof (e.g., the location sensor 222). For example, in the illustrative embodiment, the encoder 232 is configured to determine the pitch angle Θ of the projected laser beam 104. It should be appreciated that the encoder 232 may be embodied as any suitable electrical, mechanical, and/or optical encoder configured to generate angular measurements of the adjustable sensor group 224 and/or components thereof (e.g., the location sensor 222).

The power source/power management circuity 250 of the asset tracking device 202 is configured to supply or generate power to satisfy some or all of the power consumption requirements of the asset tracking device 202 or, more generally, the survey instrument 102. For example, in some embodiments, onboard power storage sources can be utilized (i.e., battery cells, etc.) to store and supply power to the survey instrument 102 and components thereof In other embodiments, the survey instrument 102 may include a solar array configured to be exposed to sunlight for generation of power for the survey instrument 102 and components thereof. As shown in FIG. 3, the illustrative power source/power management circuity 250 is in electrical communication with the various components of the asset tracking device 202 via one or more power connections 252 (e.g., point-to-point links, bus links, wires, cables, printed circuit board traces, etc.).

Figure 4:
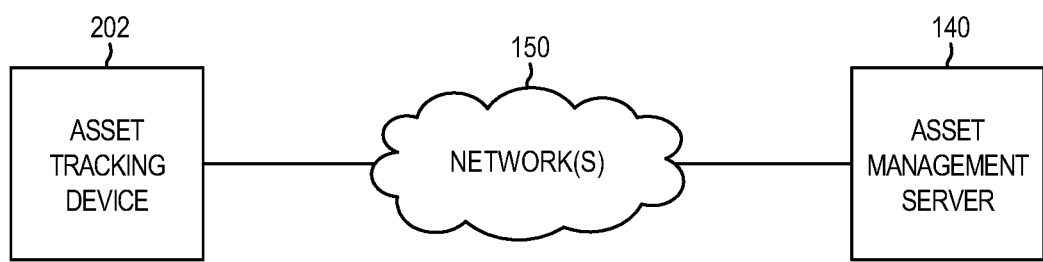
FIG. 4 is a simplified block diagram of at least one embodiment of the asset tracking device of FIGS. 1-3 communicating with a remote asset management server.
Figure 5:
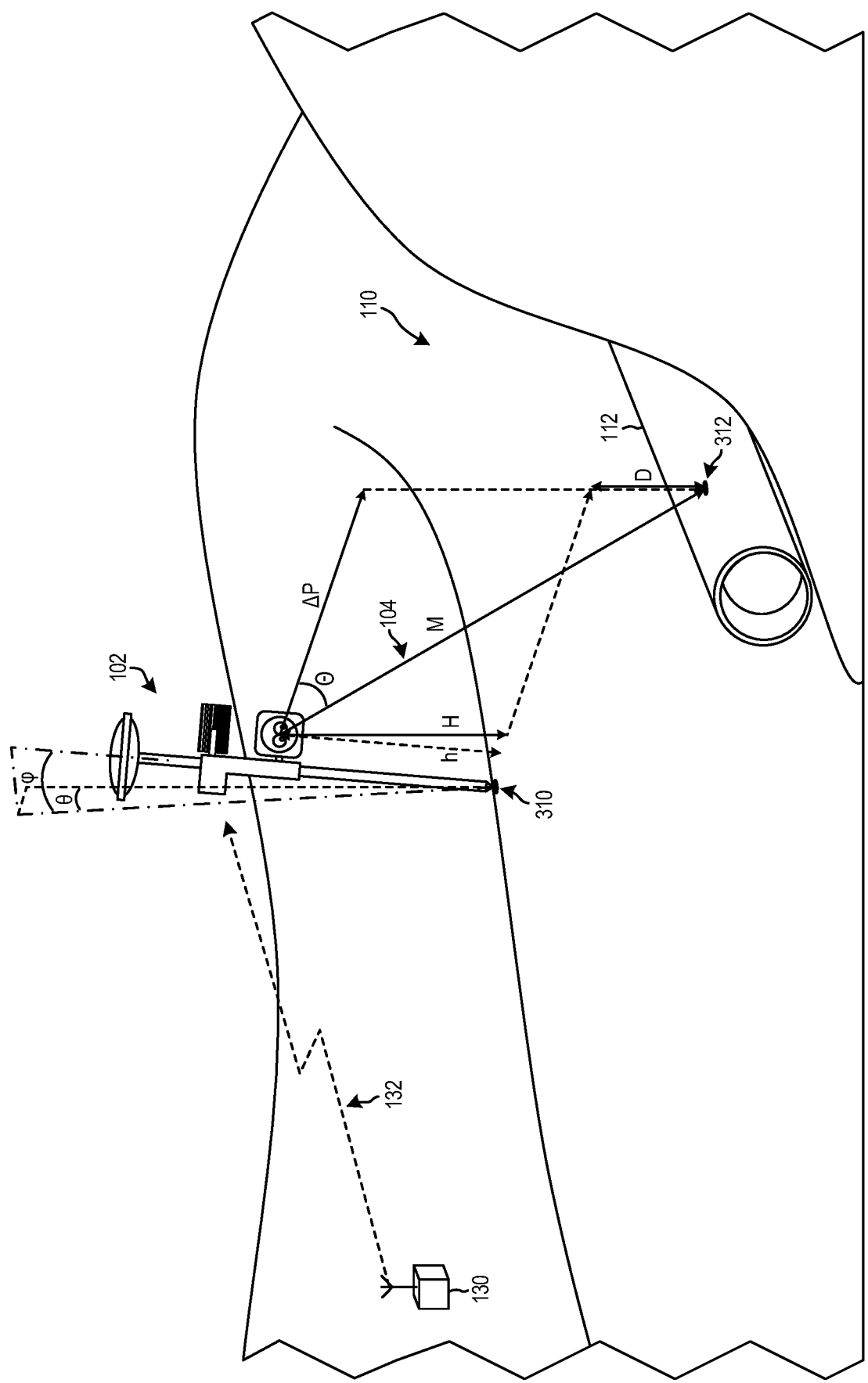
FIG. 5 is an illustrative diagram of using the survey instrument of FIGS. 1 and 2 to track the location and depth of an underground asset.

Referring to FIG. 4, the asset management server 140 may be embodied as any type of computing device capable of performing the functions described herein. As such, the asset management server 140 may include devices and structures commonly found in computing devices such as processors, memory devices, communication circuitry, and data storages, which are not shown in FIG. 4 for clarity of the description. In some embodiments, the asset management server 140 is configured to receive data from the asset tracking device 202 of the survey instrument 102. For example, the asset management server 140 is configured to receive and store location data (e.g., latitude, longitude, and elevation) corresponding to the target measurement point 312 or position on the underground asset 112. Additionally, in some embodiments, the asset management server 140 is configured to receive additional operator-supplied data, annotations, and/or digital images corresponding to underground asset 112 and/or one or more target measurement points 312, 322, 332 on the underground asset 112. Such information can later be retrieved and transmitted to the asset tracking device 202 or another asset locating device (not shown) to facilitate an operator in locating where the underground asset 112 is buried or located.

Figure 7:
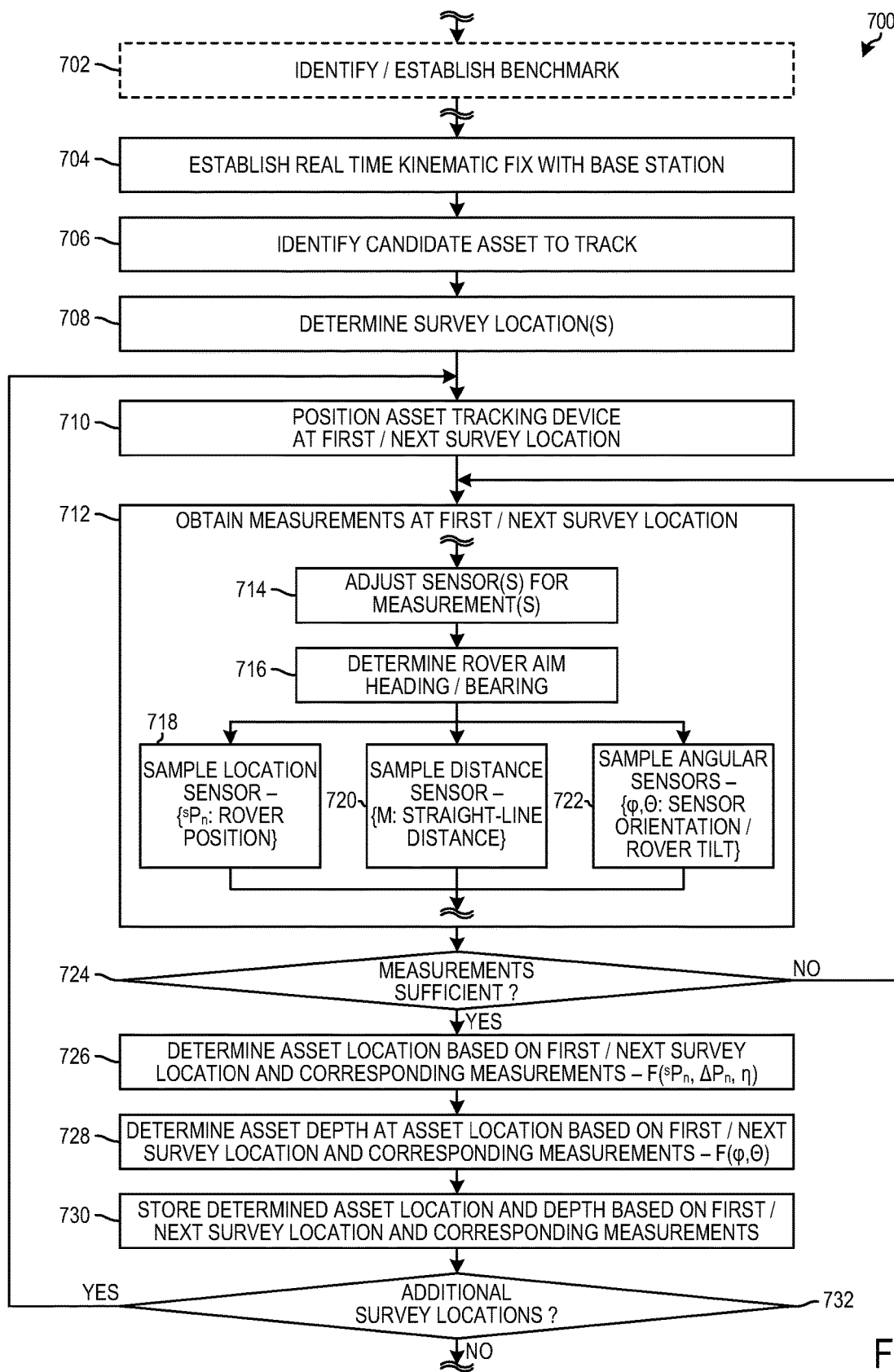
FIG. 7 is a simplified flow diagram of at least one embodiment of a method that may be used to track the location and depth of one or more positons along the length of an underground asset.

Referring now to FIG. 7, a method 700 that may be used to track the location and depth of one or more positons along the length of an underground asset 112 is shown. The method begins with block 702 in which a benchmark is established or identified, in some embodiments. The benchmark may be any geographical point having a known location and elevation.

In block 704, RTK communications are established or otherwise enabled between the location sensor 222 forming part of the asset tracking device 202 of the survey instrument 102 and a base station 130. For example, in some embodiments, the location sensor 222, or more generally the asset tracking device 202, is configured to receive communications or signals broadcasted by the base station 130. The base station 130 may be a RTK base station or any other device having a known location and elevation. In the illustrative embodiment, the base station 130 is positioned or otherwise located at the benchmark. As such, the location and elevation of the base station 130 is the same as, or substantially similar to, the known location and elevation of the benchmark. It should be appreciated, however, that the base station 130 may have a different location and/or elevation than the known location and/or elevation of the benchmark, in some embodiments. For example, the base station 130 may be located at a higher elevation and/or laterally offset from the known location and/or elevation of the benchmark. Furthermore, in some embodiments, the base station 130 may be located independently of a benchmark (e.g., a stand-alone base station 130). In such cases, the location and elevation of the stand-alone base station 130 may be determined in advance during installation and/or configuration. As discussed herein, the base station 130 can be embodied as one or more radio communications towers or components (e.g., cellular communications towers, radio towers, radio antennas, broadcasting components, etc.) configured to transmit or broadcast data or signals that can be used by survey instruments and other computing devices to determine a current location and/or location correction data. The RTK communications may include signals 132 (e.g., correction signals) and/or data messages transmitted by the base station 130. In some embodiments, the RTK communications between the location sensor 222 of the asset tracking device 202 and the base station 130 are bidirectional. That is, signals and/or data may be transmitted in either direction between the location sensor 222 of the asset tracking device 202 and the base station 130.

In block 706, a candidate underground asset 112 is identified to be tracked. As discussed herein, the underground asset 112 may be any type of component, material, or asset installed or suitable to be installed at, above, or below grade. That is, the underground asset 112 need not be buried or covered to be tracked and identified by the technologies disclosed herein.

In block 708, after the candidate underground asset 112 to track has been identified, one or more survey locations 310, 320, 330 are determined (FIG. 6). The survey location(s) 310, 320, 330 may be located proximate to the trench 110 (FIG. 1) or excavated area of soil (or other material) within which the underground asset 112 is being installed, repaired, and/or identified. In some embodiments, one or more of the survey location(s) 310, 320, 330 are located at an elevation higher than the elevation of the portion of the trench 110 within which the underground asset 112 is being installed, repaired, and/or identified. That is, one or more of the survey location(s) 310, 320, 330 are not within the trench 110 but are instead outside the trench 110 (e.g., on unexcavated or partially unexcavated soil). It should be appreciated that identifying and utilizing survey locations 310, 320, 330 located outside of the trench 110 advantageously enables operators of the survey instrument 102 to more safely determine and track the location and depth of different portions of the asset 112 without needing to actually be in the trench 110 itself. It should also be appreciated, however, that one or more survey locations (not shown) can also be identified within the trench 110 if line-of-sight to a target location (e.g., one of the target measurement points 312, 322, 332) cannot be achieved from an identified survey location (e.g., one of the identified survey locations 310, 320, 330).

In block 710, the survey instrument 102 is positioned at the first/next determined survey location 310. Subsequently, in block 712, various measurements and data corresponding to the survey instrument 102 and a first/next target measurement point 312 on the underground asset 112 are obtained or otherwise collected (e.g., measured, sampled, calculated, etc.). To do so, in block 714, one or more of the sensor(s) 220 of the asset tracking device 202 are adjusted. For example, in the illustrative embodiment, the adjustable sensor group 224 is rotated or tilted relative to the support member 260 or any other portion of the survey instrument 102 such that at least the distance sensor 226 is aimed or otherwise angled towards the first/next target measurement point 312 on the underground asset 112. It should be appreciated that other sensors such as, for example, the image sensor 228, may be aimed or angled towards the first/next target measurement point 312 on the underground asset 112 based on the rotation and/or tilting of the adjustable sensor group 224 relative to the support member 260. In some embodiments the adjustable sensor group 224 is configured to rotate or tilt within an angular range from about −90 degrees to about +90 degrees relative to the support member 260 or some other reference plane.

In block 716, the heading and/or bearing, in degrees, of the survey instrument 102 (e.g., the "rover") is determined relative to magnetic north or any other reference heading. In particular, the bearing or heading η of the adjustable sensor group 224 (or at least the direction or heading at which the distance sensor 226 is aimed) is determined. To do so, in some embodiments, the asset tracking device 202 of the survey instrument 102 obtains direction data from a magnetic compass or other direction sensor. Additionally or alternatively, the asset tracking device 202 may be configured to use signals 132 (e.g., correction signals) and/or data messages transmitted by the base station 130 to determine the heading or bearing η of the adjustable sensor group 224 (or at least the direction or heading at which the distance sensor 226 is aimed). In other embodiments, the bearing or heading η of the adjustable sensor group 224 (or at least the direction or heading at which the distance sensor 226 is aimed) can be determined by "shooting" the base station 130 or a benchmark (e.g. measuring the angle and/or distance between the survey instrument 102 and the base station 130 or benchmark).

Next, in block 718, the location sensor 222 is sampled to determine an accurate location (e.g., latitude and longitude) and elevation of the survey instrument 102 at the first/next survey location 310. To do so, the location sensor 222 receives data or signals 122 transmitted by the orbiting navigation satellites 120 (e.g., Global Positioning System (GPS) satellites). Thereafter, the location sensor 222 determines an initial location and elevation of the survey instrument 102 based at least in part on, or otherwise as a function of the signals 122 received from the navigation satellites 120. The location sensor 222 also receives one or more signals 132 (e.g., RTK correction signals) from the base station 130, which may be used by the location sensor 222 to correct or otherwise increase the accuracy of the location and elevation initially determined from the signals 122 received from the navigation satellites 120.

In block 720, the distance sensor 226 is sampled to measure the straight-line distance M between the distance sensor 226, or more generally the survey instrument 102, and the first/next target measurement point 312 on the underground asset 112. To do so, in the illustrative embodiment, the distance sensor 226 projects a laser beam 104 to the target measurement point 312 on the underground asset 112 and measures the straight-line distance M therebetween. In some embodiments, the distance sensor 226 and/or other components of the asset tracking device 202 factor in an offset distance corresponding to the distance between the distance sensor 226 and the support member 260 of the survey instrument 102. As discussed in more detail below, the distance sensor 226 and/or other components of the asset tracking device 202 factor in an offset distance based on the tilt or angle (e.g., the angle θ, the angle φ, etc.) at which the operator is holding the survey instrument 102 relative to a vertical plane.

In block 722, the angular sensors (i.e., the inertial measurement sensor 230, the encoder 234, etc.) are sampled. For example, in some embodiments, the encoder 234 measures or determines the pitch angle Θ of the laser beam 104 projected to the target measurement point 312 on the underground asset 112. As discussed herein, the encoder 232 may be embodied as any suitable electrical, mechanical, and/or optical encoder configured to generate angular measurements of the adjustable sensor group 224, the survey instrument 102, and/or components thereof (e.g., the location sensor 222, the support member 260). In some embodiments, the encoder 234 is configured to measure angles ranging from about −90 degrees to about +90 degrees relative to a plane defined by the support member 260 of the instrument. It should be appreciated that the encoder 234 may also be configured to measure angles relative to any other reference plane. In alternative embodiments, the inertial measurement sensor 230 may also be configured to determine the pitch angle Θ of the laser beam 104 projected to the target measurement point 312 on the underground asset 112.

Additionally, in block 722, the inertial measurement sensor 230 measures or determines the tilt angle (e.g., the tilt angle θ, the tilt angle φ, etc.) of the survey instrument 102 relative to a vertical plane. In some embodiments, such angles may be measured and/or determined by the inertial measurement sensor 230 based on the angle at which the adjustable sensor group 224 is tilted and/or angled. It should be appreciated that such tilt or angle (e.g., the tilt angle θ, the tilt angle φ, etc.) may be used to correct and/or compensate for measurements taken while the survey instrument 102 is being held out of plumb by the operator.

It should be appreciated that, in other embodiments, the particular order in which the location sensor 222, the distance sensor 226, the inertial measurement sensor 230, and the encoder are sampled in blocks 718-722 may be different or occur substantially at the same time. For example, the distance sensor 226 may be sampled in block 720 before the location sensor 222 and the inertial measurement sensor 230 are sampled in block 718 and block 722, respectively. In another example, the inertial measurement sensor 230 and/or the encoder 234 may be sampled in block 722 before the location sensor 222 is sampled in block 718 and/or before the distance sensor 226 is sampled in block 720.

In decision block 724, it is determined whether the obtained measurements and data corresponding to the survey instrument 102 and the first/next target measurement point 312 on the underground asset 112 are sufficient to determine an accurate location and depth (e.g., elevation or altitude) corresponding to the first/next target measurement point 312. To do so, in some embodiments, it may be determined whether the obtained measurements are within a reference tolerance range. If, in decision block 724, it is determined that the obtained measurements are sufficient to determine an accurate location and depth corresponding to the first/next target measurement point 312 on the underground asset 112, the method 700 advances to block 726. If, however, it is instead determined in decision block 724 that the obtained measurements are insufficient to determine an accurate location and depth corresponding to the first/next target measurement point 312 on the underground asset 112, the method 700 loops back to block 712 and new and/or additional measurements and data are obtained in blocks 716-722.

In block 726, an accurate location (e.g., latitude and longitude) corresponding to the first/next target measurement point 312 on the underground asset 112 is determined. To do so, the asset tracking device 202 first determines the position difference ΔP (i.e., the distance), in local coordinates, between the location (e.g., latitude and longitude) of the survey instrument 102 at the first/next survey location 310 and the corresponding first/next target measurement point 312 or location on the underground asset 112 (see FIG. 5). In the illustrative embodiment, the asset tracking device 202 calculates the position difference ΔP using the measurements and data obtained in block 712 and the following formula:

$$\Delta P = M \cos \Theta$$

wherein M is the straight-line distance M measured between the distance sensor 226 and the target measurement point 312 on the underground asset 112; and Θ is the pitch angle of the laser beam 104 projected by the distance sensor 226 to the target measurement point 312 on the underground asset 112.

In determining the accurate location corresponding to the first/next target measurement point 312 on the underground asset 112, the asset tracking device 202 also compensates for the direction or heading at which the measurements and data were obtained in block 714 relative to magnetic north or any other reference heading (see FIG. 6). To do so, in some embodiments, the asset tracking device 202 utilizes the bearing or heading η of the adjustable sensor group 224 (or at least the direction or heading at which the distance sensor 226 is aimed) determined in block 716. Thereafter, the asset tracking device 202 utilizes the determined bearing or heading η, the determined position difference ΔP and, in some embodiments, the determined location and/or data corresponding to the survey instrument 102, to determine the actual location of the first/next target measurement point 312 on the underground asset 112. To do so, in the illustrative embodiment, the asset tracking device 202 utilizes the following formula:

$$P_n = \{(^SP_n + \Delta P_n)\sin \eta, (^SP_n + \Delta P_n)\cos \eta\}$$

wherein $P_n$ is the particular measurement point being determined; η is the heading or direction; and $^SP_n$ is the location and/or data corresponding to the survey instrument 102 at the corresponding survey location.

In block 728, a depth (e.g., elevation or altitude) corresponding to the first/next target measurement point 312 on the underground asset 112 is determined. To do so, the asset tracking device 202 first determines, in local coordinates, the effective height H of the adjustable sensor group 224 relative to the elevation corresponding to the first/next survey location 310 at which the survey instrument 102 is positioned (see FIG. 5). In the illustrative embodiment, the asset tracking device 202 first calculates the effective height H of the adjustable sensor group 224 (or, more specifically, the distance sensor 226) using the tilt angle (e.g., the tilt angle θ, the tilt angle φ, etc.) of the survey instrument 102 obtained by the inertial measurement sensor 230 in block 722 and the following formula:

$$H = h \cos \varphi$$

wherein h is the distance (e.g., height) between the distance sensor 226 within the adjustable sensor group 224 and the lower end 262 and/or the point 266 of the support member 260.

In determining the depth corresponding to the first/next target measurement point 312 on the underground asset 112, the asset tracking device 202, in block 728, subsequently utilizes the determined effective height H of the adjustable sensor group 224 (or, more specifically, the distance sensor 226) and the following formula:

$$D = M \sin \Theta - H$$

wherein M is the straight-line distance measured between the distance sensor 226 and the target measurement point 312 on the underground asset 112; Θ is the pitch angle of the laser beam 104 projected by the distance sensor 226 to the target measurement point 312 on the underground asset 112; and H is the determined effective height of the distance sensor 226 relative to the elevation corresponding to the first/next survey location 310 at which the survey instrument 102 is positioned.

In block 730, the asset tracking device 202 stores the determined location and depth corresponding to the first/next target measurement point 312 on the underground asset 112 in a local data store (e.g., the memory 208, the data storage 210, and/or any other memory or storage component of the asset tracking device 202). It should be appreciated that, in some embodiments, the asset tracking device 202 also stores additional data and/or annotations (e.g., asset type, asset description, asset material, dimensions, observed condition of asset, manufacturer, model number, installation or repair date, notes, digital images etc.) corresponding to the underground asset 112 being installed, installed, repaired, and/or identified. In the illustrative embodiment, the determined location and depth (and any additional data and annotations) corresponding to the first/next target measurement point 312 on the underground asset 112 is transmitted to the remote asset management server 140 for storage, processing, and later retrieval by one or more operators. It should be appreciated, however, that the determined location and depth (and any additional data and annotations) corresponding to the first/next target measurement point 312 on the underground asset 112 may not be transmitted to the remote asset management server 140 via one or more communication networks 150, in some embodiments. In such embodiments, the determined location and depth (and any additional data and annotations) may be kept local to the asset tracking device 202 and used by operators to track and identify underground assets 112 without the need for communication networks 150 (or used in locations with little or no access to the communication networks 150).

In decision block 732, it is determined whether additional survey locations (e.g., survey location 320, survey location 330, etc.) were identified (FIG. 6). If, in decision block 732, it is determined that additional survey locations (e.g., survey location 320, survey location 330, etc.) were identified (FIG. 6), the method 700 loops back to blocks 710-730 at which the survey instrument 102 is positioned at the next determined survey location (e.g., survey location 320, survey location 330, etc.) and various measurements and data corresponding to the survey instrument 102 and the corresponding next target measurement point (e.g., target measurement point 322, target measurement point 332, etc.) on the underground asset 112 are obtained, the location and depth corresponding to the next target measurement point 322, 332 on the underground asset 112 is determined, and the location and depth (and any other data) corresponding to the next target measurement point 322, 332 on the underground asset 112 is stored and/or transmitted to the remote asset management server 140. If, however, it is instead determined in decision block 732 that no additional survey locations (e.g., survey location 320, survey location 330, etc.) were identified, the method 700 terminates.

Figure 8:
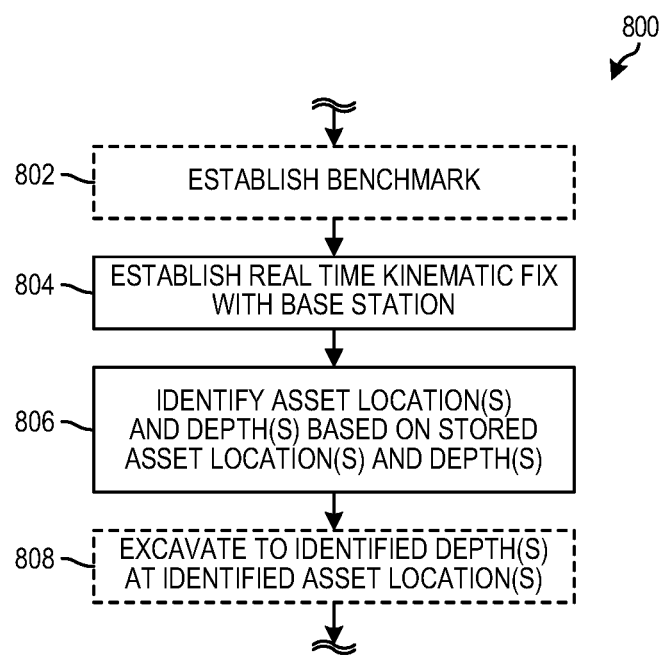
FIG. 8 is a simplified flow diagram of at least one embodiment of a method that may be used to identify the location and depth of one or more positions along the length of a buried underground asset.

Referring now to FIG. 8, a method 800 that may be used to identify the location and depth/elevation of one or more positions along the length of an asset 112 located at, above, or below grade. The method 800 begins with block 802 in which a benchmark is identified, in some embodiment's. As discussed, the benchmark may be any geographical point having a known location and elevation. As discussed herein, the base station 130 can be embodied as one or more radio communications towers (e.g., cellular communications towers, etc.) configured to transmit or broadcast data that can be used by survey instruments and other computing devices to determine a current location and/or location correction data.

In block 804, RTK communications are established or otherwise enabled between the location sensor 222 forming part of the asset tracking device 202 of the survey instrument 102 and a base station 130. For example, in some embodiments, the location sensor 222, or more generally the asset tracking device 202, is configured to receive communications or signals broadcasted by the base station 130. As discussed, the base station 130 may be a RTK base station or any other device having a known location and elevation, which may be the same or different location and/or elevation than that of the benchmark, if identified in block 802. The RTK communications may include signals 132 (e.g., correction signals) and/or data messages transmitted by the base station 130. In some embodiments, the RTK communications between the location sensor 222 of the asset tracking device 202 and the base station 130 are bidirectional. That is, signals and/or data may be transmitted in either direction between the location sensor 222 of the asset tracking device 202 and the base station 130.

In block 806, the asset tracking device 202 of the survey instrument 102 identifies one or more locations and corresponding depths along the length of the asset 112. To do so, in some embodiments, the asset tracking device 202 is configured to receive stored locations and corresponding depths from the asset management server 140 via the one or more communication networks 150. In other embodiments, the locations and corresponding depths for the asset 112 may be stored and retrieved locally by the asset tracking device 202. In some embodiments, the asset tracking device 202 is configured with various indicators (visual or audible) and/or user interfaces to facilitate identification, by an operator of the survey instrument 102, of a particular location of the asset 112. It should be appreciated that in some embodiments, the asset tracking device 202 is configured to utilize the communications sent to and/or received from the base station 130 to determine a current location and elevation. In such cases, the asset tracking device 202 can be configured to use the historical location and depth data of the asset 112 and the current location and elevation of the asset tracking device 202 to facilitate in identifying one or more locations and corresponding depths along the length of the asset 112.

In embodiments in which the asset 112 is buried below grade, an operator of the survey instrument 102 or another person may, in block 808, excavate the soil to the corresponding depth at the identified location to uncover the buried asset 112. To do so, the operator or other person may use any suitable machinery or tool to excavate and uncover the buried asset 112.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method of tracking an underground asset, the method comprising:
   determining, by a survey instrument, a current geographic location of the survey instrument positioned at a survey location, the survey location being proximate to an excavated area including an underground asset;
   determining, by the survey instrument, a heading of an adjustable sensor group of the survey instrument aimed at a target measurement point on the underground asset;
   measuring, by the survey instrument, a distance between the adjustable sensor group and the target measurement point on the underground asset;
   determining, by the survey instrument, a pitch angle at which the adjustable sensor group is aimed at the target measurement point on the underground asset;
   determining, by the survey instrument, a geographic location of the target measurement point on the underground asset based at least in part on the current geographic location of the survey instrument, the determined heading, the measured distance between the adjustable sensor group and the target measurement point, and the determined pitch angle at which the adjustable sensor group is aimed at the target measurement point;
   determining, by the survey instrument, an effective height of the adjustable sensor group relative to an elevation corresponding to the survey location;
   determining, by the survey instrument, a depth of at least a portion of the underground asset at the target measurement point based at least in part on the determined height of the adjustable sensor group relative to the elevation corresponding to the survey location, the measured distance between the adjustable sensor group and the target measurement point, and the determined pitch angle at which the adjustable sensor group is aimed at the target measurement point.

2. The method of claim 1, further comprising receiving, by the survey instrument, a communication transmitted from a base station, the communication transmitted from the base station including a correction signal; and
   wherein determining the current geographic location of the survey instrument comprises determining the current geographic location of the survey instrument at the survey location based at least in part on the correction signal.

3. The method of claim 2, wherein the base station is configured for real-time kinematic communications.

4. The method of claim 2, wherein the base station is located at a benchmark, the benchmark having a known geographic location and a known elevation.

5. The method of claim 1, wherein at least a portion of the underground asset of the excavated area is exposed.

6. The method of claim 1, wherein measuring the distance between the adjustable sensor group and the target measurement point on the underground asset comprises projecting, by a laser range finder of the adjustable sensor group, a laser beam to the target measurement point to measure the distance between the adjustable sensor group and the target measurement point.

7. The method of claim 1, wherein determining the pitch angle at which the adjustable sensor group is aimed at the target measurement point on the underground asset comprises generating, by an optical encoder of the adjustable sensor group, the pitch angle at which the adjustable sensor group is aimed at the target measurement point on the underground asset.

8. The method of claim 1, further comprising storing, by the survey instrument, the determined geographic location of the target measurement point on the underground asset and the depth of the target measurement point on the underground asset for later identification of a portion of the underground asset.

9. The method of claim 8, further comprising storing, by the survey instrument, an annotation corresponding to the underground asset.

10. The method of claim 9, wherein storing the determined geographic location of the target measurement point on the underground asset and the depth of the target measurement point on the underground asset comprises storing the determined geographic location of the target measurement point on the underground asset and the depth of the target measurement point on the underground asset in a remote data store; and wherein storing the annotation corresponding to the underground asset comprises storing the annotation corresponding to the underground asset in the remote data store.

\* \* \* \* \*